(12) United States Patent
Ko et al.

(10) Patent No.: US 9,983,688 B2
(45) Date of Patent: May 29, 2018

(54) PROTECTIVE COVER

(71) Applicant: Samsung Electronics Co., Ltd., Gyeonggi-do (KR)

(72) Inventors: A-Reum Ko, Seoul (KR); Hyun-Chul Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days. days.

(21) Appl. No.: 15/073,793

(22) Filed: Mar. 18, 2016

(65) Prior Publication Data

US 2016/0282955 A1    Sep. 29, 2016

(30) Foreign Application Priority Data

Mar. 23, 2015 (KR) .................. 10-2015-0040027

(51) Int. Cl.
  *G06F 3/02* (2006.01)
  *A45C 11/00* (2006.01)
  *H04B 1/3888* (2015.01)
  *G06F 1/16* (2006.01)
  *H04M 1/04* (2006.01)

(52) U.S. Cl.
  CPC ............ *G06F 3/0202* (2013.01); *A45C 11/00* (2013.01); *G06F 1/16* (2013.01); *H04B 1/3888* (2013.01); *A45C 2011/003* (2013.01); *H04M 1/04* (2013.01); *H04M 2250/18* (2013.01)

(58) Field of Classification Search
  CPC . G06F 3/0202; A45C 11/00; A45C 2011/003; H04B 1/3888

USPC .................................................. 361/679.55
See application file for complete search history.

(56) References Cited

U.S. PATENT DOCUMENTS

| 5,988,685 | A | 11/1999 | Mogelonsky et al. |
| D692,886 | S | 11/2013 | Bates et al. |
| 9,451,822 | B2 * | 9/2016 | Gu .............. A47B 23/044 |
| 2012/0110354 | A1 * | 5/2012 | Liu .............. G06F 1/1632 713/300 |
| 2012/0293953 | A1 * | 11/2012 | Wu .............. F16M 11/10 361/679.56 |
| 2013/0016467 | A1 * | 1/2013 | Ku .............. F16M 11/10 361/679.08 |
| 2013/0088431 | A1 * | 4/2013 | Ballagas .............. G06F 1/1626 345/168 |
| 2014/0002978 | A1 * | 1/2014 | Ding .............. G06F 1/1667 361/679.11 |
| 2014/0071607 | A1 * | 3/2014 | Frinak .............. G06F 1/1624 361/679.09 |
| 2014/0083883 | A1 * | 3/2014 | Elias .............. G06F 1/1626 206/320 |

FOREIGN PATENT DOCUMENTS

KR    20-2012-0008365 U    12/2012

* cited by examiner

*Primary Examiner* — Tuan T Dinh
*Assistant Examiner* — Rockshana Chowdhury
(74) *Attorney, Agent, or Firm* — Cha & Reiter, LLC

(57) ABSTRACT

A protective cover may include a first cover part configured to be opened to expose a front surface of the electronic device and to be closed to conceal the front surface of the electronic device; a second cover part rotatably coupled to the first cover part and detachably arranged on a rear surface of the electronic device; and an input device detachably provided in the first cover part.

14 Claims, 20 Drawing Sheets

PROTECTIVE COVER

CLAIM OF PRIORITY

This application claims the priority under 35 U.S.C. § 119(a) to Korean Application Serial No. 10-2015-0040027, which was filed in the Korean Intellectual Property Office on Mar. 23, 2015, the entire contents of which are hereby incorporated by reference.

TECHNICAL FIELD

The present disclosure generally relates to a protective cover and more particularly, for example, to a protective cover for protecting an electronic device.

BACKGROUND

In recent years, portable electronic devices, such as, for example, a mobile communication terminal, a Portable Multimedia Player (PMP), an MP3 player, a tablet Personal Computer (PC), and an electronic book, have increased in popularity and have enabled users to enjoy various contents while away from home.

Such an electronic device often includes a display unit, an antenna apparatus, an input/output apparatus, and a data transmission/reception apparatus enabling wireless communication with a counterpart while a user carries the electronic device. Further, in order to satisfy various demands of a user, portable electronic device often provide various functions such as reproduction of music and video, a game, a camera function, schedule management, and a dictionary in addition to an original function thereof, and further, provides a function of searching for various pieces of information and adding a new application, using a communication technology with the rapid development of an information communication technology.

In addition, the light weight and small size of the portable electronic device enables a user to carry the portable electronic device with his/her hand, to store or pack the portable electronic device in a bag, and/or to use the portable electronic device while moving. However, as there is a danger of loss and damage resulting from the storing and carrying the device, a protective cover may be coupled to the device in order to safely protect the same.

Further, a portable keyboard interworking with the portable electronic device is commonly used in order for a user to smoothly perform a document task using the portable electronic device or to more conveniently use an application of the portable electronic device.

SUMMARY

When using a portable keyboard for inputting information to a portable electronic device is commonly used, a user may have difficulty in using the portable electronic device and the portable keyboard in a state in which the portable electronic device and the portable keyboard simultaneously are kept, for example, on his/her knees when the user uses public transportation such as a subway and a bus.

Further, the user may have difficulty separately carrying the portable electronic device and the portable keyboard.

Further, in a state in which the portable electronic device is covered by a protective cover, there may also be an inconvenience to the user because the user would have to physically open the protective cover from the portable electronic device in order to determine whether a message is received.

In an embodiment of the present, a protective cover may include a portable keyboard that is detachably mounted thereto, thereby improving transportability.

In a further embodiment of the present disclosure, a protective cover which can be conveniently used by a user in a state in which a portable electronic device and a portable keyboard are kept on his/her knees even while the user moves using public transportations.

Further, various embodiments of the present disclosure provide a protective cover which is configured to (a) determine whether a message is received; or (b) transmit a message using a keyboard even while a portable electronic device is covered by a protective cover.

A protective cover according to an embodiment of the present disclosure may include: a first cover part configured to be opened to expose a front surface of the electronic device and to be closed to conceal the front surface of the electronic device; a second cover part rotatably coupled to the first cover part and detachably arranged on a rear surface of the electronic device; and an input device detachably provided in the first cover part.

A protective cover according to an embodiment of the present disclosure facilitates an input device being carried together with an electronic device. The input device may be detachably arranged on the front surface of a first cover part, and thus has an improved portability.

Further, the first cover part includes a window part on the protective cover through which a part of the front surface of the electronic device is exposed, so that the electronic device can identify information through the window part without opening the protective cover even while the electronic device is covered by the protective cover, and then perform various functions of the electronic device through an input device.

These and other aspects of the present disclosure are more fully described hereinbelow.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
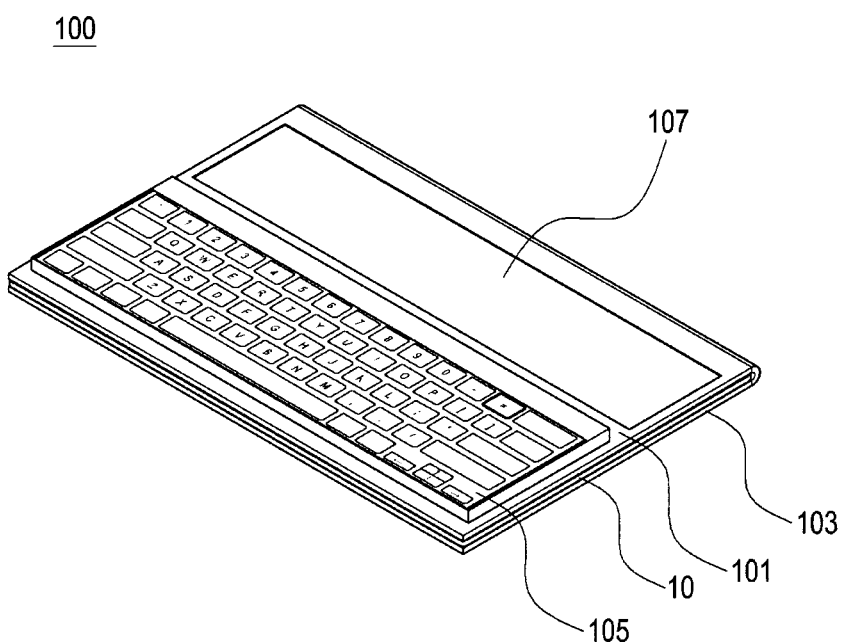
FIG. 1 is a perspective view illustrating a protective cover according to one of various embodiments of the present disclosure.

Hereinafter, various embodiments of the present disclosure will be described with reference to the accompanying drawings. However, it should be understood that there is no intent to limit the present disclosure to the particular embodiments disclosed herein. Rather, the present disclosure should be construed to cover various modifications, equivalents, and/or alternatives of embodiments of the present disclosure. In describing the drawings, similar reference numerals may be used to designate like or similar constituent elements.

In the present disclosure, the expression "have", "may have", "include" or "may include" refers to the existence of a corresponding feature (e.g., numerical value, function, operation, or components such as elements), and is not limited to those specific features and does not exclude existence of additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

Figure 2:
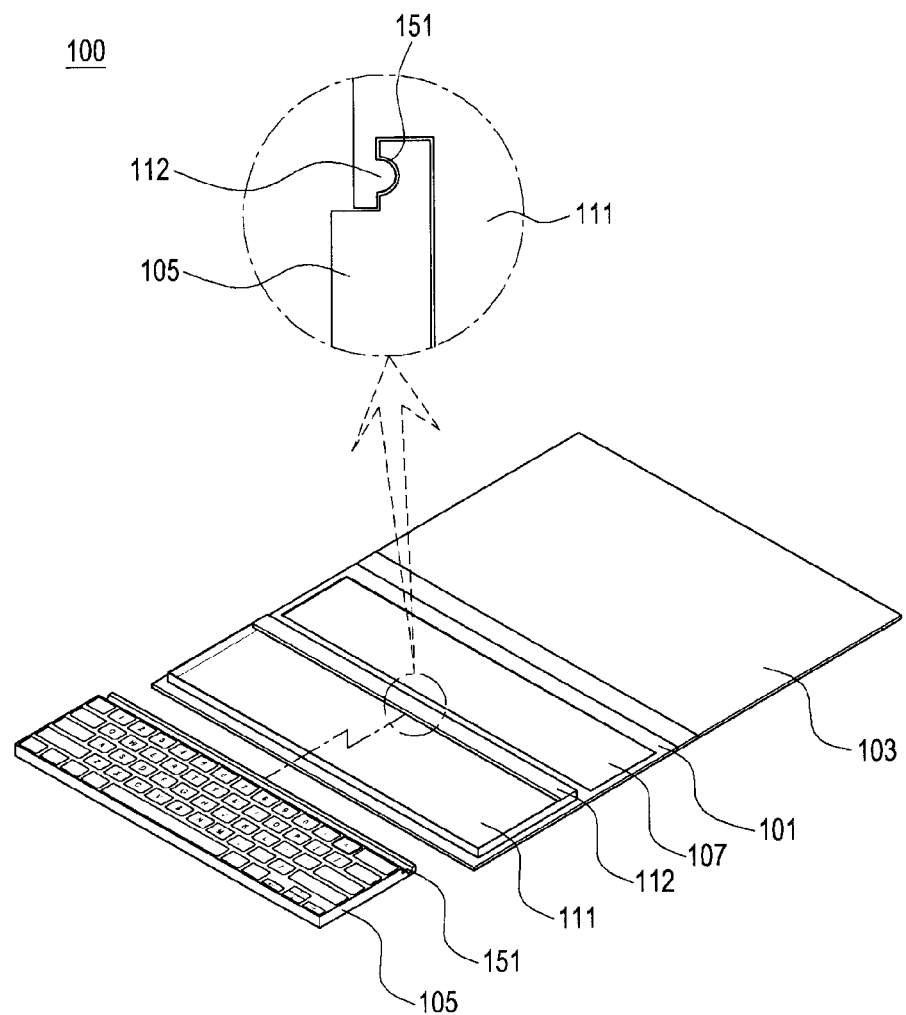
FIG. 2 is a perspective view illustrating a state in which an input device of the protective cover and a first cover part are detached from each other according to one of various embodiments of the present disclosure and showing an enlarged view of an indicated area of detail.

FIG. 1 is a perspective view illustrating a protective cover according to one of various embodiments of the present disclosure. FIG. 2 is a perspective view illustrating a state in which an input device of the protective cover and a first cover part are detached from each other according to one of various embodiments of the present disclosure.

First, a protective cover according to various embodiments of the present disclosure may be operatively coupled to an electronic device 10. Here, the electronic device 10 may include all information communication devices and multimedia devices, and an application device therefor such as a Portable Multimedia Player (PMP), an MP3 player, a navigation unit, a gaming device, a notebook, a netbook, an advertisement board, a Television (TV), a digital broadcast reception device, a Personal Digital Assistant (PDA), a smartphone, a tablet Personal Computer (PC), and an electronic book as well as a mobile communication terminal operating by communication protocols corresponding to various communication systems.

Referring to FIGS. 1 and 2, a protective cover 100 according to various embodiments of the present disclosure may include a first cover part 101, a second cover part 103, and an input device 105. As shown in FIG. 1, the electronic device 10 may be operatively coupled to the protective cover 100.

The first cover part 101 may be arranged on the front surface of the electronic device, and may be opened or closed to expose or conceal the front surface of the electronic device 10, as well as to protect the front surface of the electronic device 10. The second cover 103 may be mounted on the rear surface of the electronic device 10 to support the opening/closing of the first cover part 101 at the same time as being connected to the first cover part 101. For example, the second cover part 103 can be rotatably coupled to the first cover part 101 so that the first cover part 101 can be opened/closed relative to the front surface of the electronic device 10.

Further, the electronic device 10 may include a protruding groove (not illustrated), and the second cover part 103 may include a protruding structure (not illustrated) fitted in the protruding groove (not illustrated) so as be mounted to or separated from the rear surface of the electronic device 10. In contrast, the protruding structure is arranged on the rear surface of the electronic device 10, and the second cover part 103 may include a protrusion groove fitted in the protrusion structure so as to be attached to or detached from the rear surface of the electronic device 10. However, the present disclosure is not limited an embodiment in which the second cover part 103 is attached to or detached from the rear surface of the electronic device 10.

The input device 105 may be attached to or detached from the first cover part 101, and may input information to the electronic device 10 while wirelessly communicating with the electronic device 10. The wireless communication may be performed, for example, via Bluetooth or near field communication (NFC). The electronic device 105 may include, for example, a keyboard. The keyboard may include, for example, input keys for inputting a number, a letter, and a special character or the like. However, the keyboard is not limited to the input keys of the number, the letter, and the special character illustrated in FIG. 1, and may include input keys of various languages such as Korean. When the input device 105 is mounted to the first cover part 101, the input device 105 may or may not be operatively coupled to the electronic device 10.

In an embodiment, the first cover part 101 of the protective cover 100 may include a window part 107. The window part 107 may be arranged in a first region of the first cover part 101 so as to expose a part of the front surface of the electronic device 10 to the outside. Here, the first region may refer to a region adjacent to a part where the first cover part 101 and the second cover part 103 are connected to each other. Further, the window part 107 may be made of a transparent material (e.g., clear plastic or glass, for example), so that an image displayed on a part of the front surface of the electronic device can be exposed to the outside through the window part 107. Further, the window part 107 may be made of a flexible material, so that it is possible to prevent the window part 107 from being damaged even when the window part 107 receives a shock from the outside or is bent. However, the window part 107 is not limited to being a flexible material, and the window part 107 may be made of various materials such as glass or crystal, which may be more resistant to marks from, for example, scratching the window part 107.

The input device 105 may be arranged on a second region adjacent to the first region on the first cover part 101. For example, a user may input information through the input device 105 arranged on the second region of the second cover part 101 while viewing information displayed on the window part 107 arranged on the first region of the first cover part 101. As the window part 107 and the input device 105 are simultaneously provided on the first cover part 101, a user may use the electronic device 10 without opening the protective cover 100 covering the electronic device 10.

Further, the protective cover 100 according to one of various embodiments of the present disclosure may further include a reception part 111, an engaging groove 151, and an engaging part 112.

The reception part 111 may be formed on the cover part 101 to correspond to the input device 105 so as to receive the input device 105.

The engaging groove 151 may be formed at one end of the input device 105. Further, the engaging part 112 may extend from one end of the reception part 111 provided on the first cover part 101, and may be formed to correspond to the engaging groove 151. When the input device 105 is received in the reception part 111, the engaging part 112 can be fixed to the engaging groove 151. For example, the input device 105 may be received in the reception part 111 such that one end of the input device 105 faces the reception part 111, the input device 105 may maintain a state of being fixed to the reception part 111 as the engaging part 112 is inserted into the engaging groove 151 of the input device 105. In contrast, when the other end of the input device 105 is lifted up in order to separate the input device 105 from the reception part 111, a part of the engaging part 112 may be separated from the engaging groove 151, and when the other end of the input device is pulled toward an outer side of the reception part 111, the input device 105 may be separated from the reception part 111.

Figure 3:
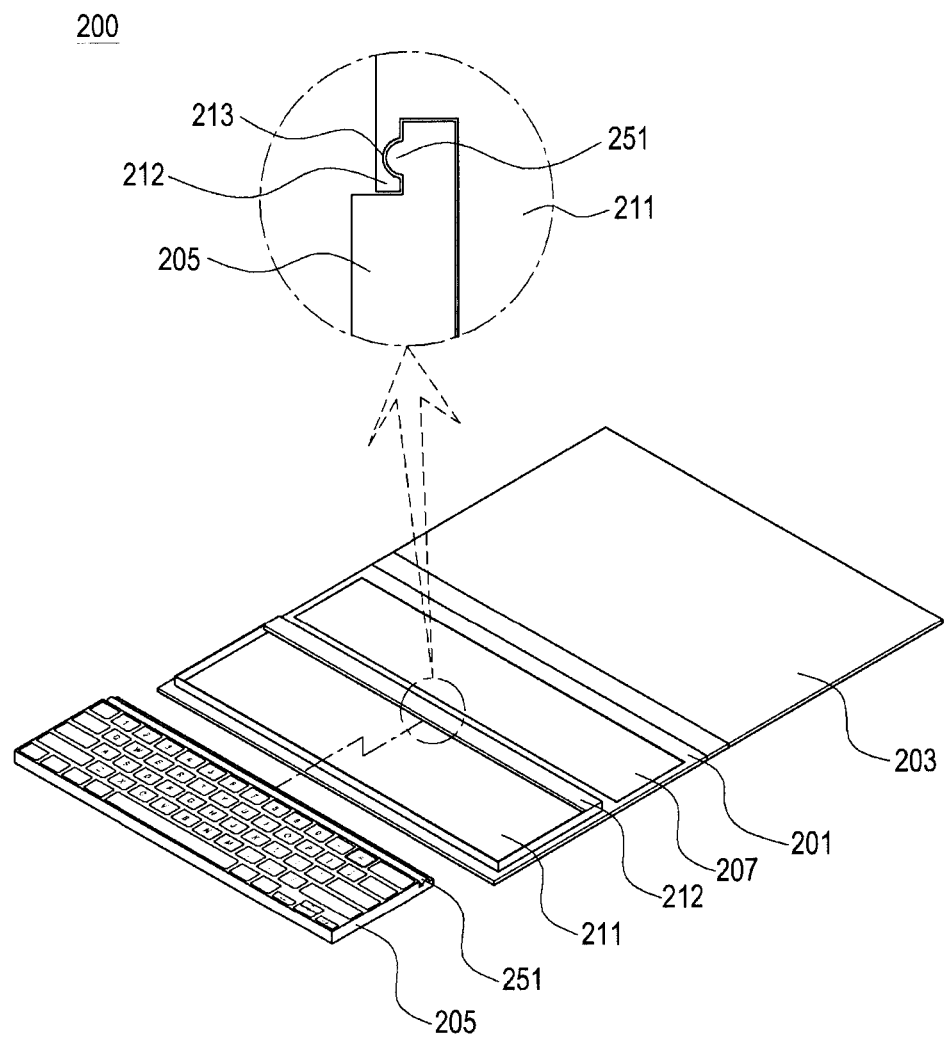
FIG. 3 is a perspective view illustrating a state in which an input device of the protective cover and a first cover part are detached from each other according to another one of various embodiments of the present disclosure and showing an enlarged view of an indicated area of detail.

FIG. 3 is a perspective view illustrating a state in which an input device of the protective cover and a first cover part are detached from each other according to another one of various embodiments of the present disclosure.

Referring to FIG. 3, a protective cover 200 according to another one of various embodiments of the present disclosure may include a first cover part 201, a second cover part 203, an input device 205, a window part 207, a reception part 211, an engaging groove 213, and an engaging part 251. In the present embodiment, a description for components similar to those of the above-described embodiment will be omitted, and the engaging groove 213 and the engaging part 251 will be mainly described.

The engaging groove 213 may be formed in an extension part 212 extending from one end of the reception part 211 within the first cover part 201. The engaging groove 213 may be formed along the lengthwise direction of the extension part 212. Further, the engaging part 251 may be formed at one end of the input device 205 to correspond to the engaging groove 213. The engaging part 251 may be made of a material having elasticity. When the input device 205 is received in the reception part 211, the engaging part 251 may be fixed to the engaging groove 213 while moving in a state in which the engaging part 251 is in contact with one surface of the extension part 212. For example, the input device 205 may be received in the reception part 211 such that one end of the input device 205 faces the reception part 111. As the engaging part 251 is inserted into the engaging groove 151, the input device 205 may maintain a state of being fixed to the reception part 211. In contrast, when the other end of the input device 205 is lifted up in order to separate the input device 205 from the reception part 211, a part of the engaging part 251 may be separated from the engaging groove 213. Continuously, when the other end of the input device 205 is pulled towards the outer side of the reception part 211, the input device 205 may be separated from the reception part 211 as the entirety of the engaging part 251 is separated from the engaging groove 213.

In this way, according to various embodiments of the present disclosure, the engaging groove may be formed in one of the first cover part and the input device, and the engaging part may be formed in the other one of the first cover part and the input device so as to be attached to or detached from the engaging groove.

Figure 4:
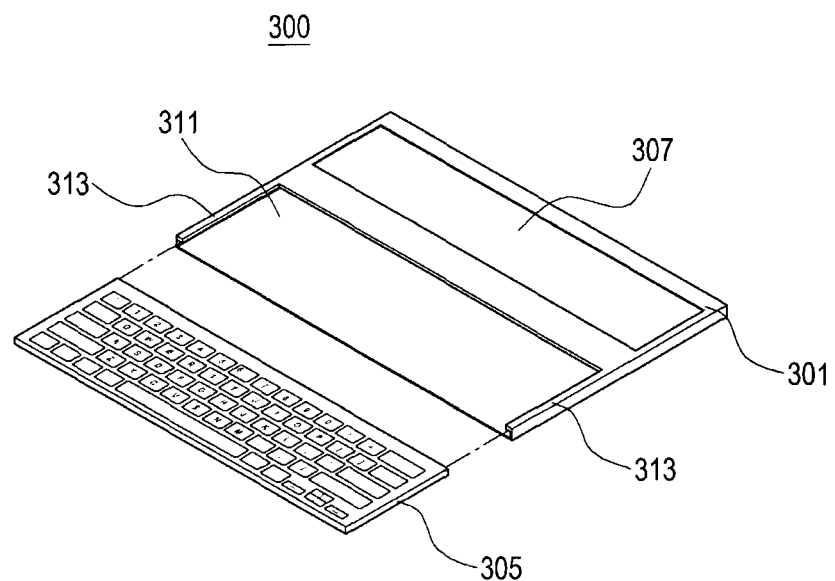
FIG. 4 is a perspective view illustrating a state in which an input device of the protective cover and a first cover part are detached from each other according to yet another one of various embodiments of the present disclosure.

FIG. 4 is a perspective view illustrating a state in which an input device of the protective cover and a first cover part are detached from each other according to yet another one of various embodiments of the present disclosure.

Referring to FIG. 4, a protective cover 300 according to yet another one of various embodiments of the present disclosure may include a first cover part 301, an input device 305, a window part 307, and a reception part 311. In the present embodiment, a description for components similar to those of the above-described embodiment will be omitted, and the first cover part 301 and the reception part 311 will be mainly described.

First, the reception part 311 may be provided in the first cover part 301, and can receive the input device 305. A lower end of the reception part 311 is opened in a size corresponding to one end of the input device 305 so that the input device 305 may be inserted into the lower end of the reception part 311.

The first cover part 301 may have a guide part 313 for guiding the input device 305 to the reception part 311. The guide part 313 may surround the side surface of the input device 305. For example, as the guide part 313 restrains the side surface of the input device 305, the input device 305 may slide on the reception part 311 without deviating therefrom. As such a guide part 313 may be provided in the first cover part 301, the input device 305 may be guided by the guide part 313 so as to be slidably coupled to the first cover part 301.

When a user wants to use the input device 305 in a state in which the electronic device 10 (FIG. 1) is covered by the protective cover 300, the input device 305 may be slidably coupled to the first cover part 301 in a direction in which an input key of the input device 305 is exposed to the outside. Further, when a user does not use the input device 305, after the input device 305 is detached from the first cover part 301, the input device 305 may be slidably coupled to the first cover part 301 in a direction in which the input key of the input device 305 faces the first cover part 301 so that the input key of the input device 305 can be prevented from being unnecessarily pushed.

Figure 5:
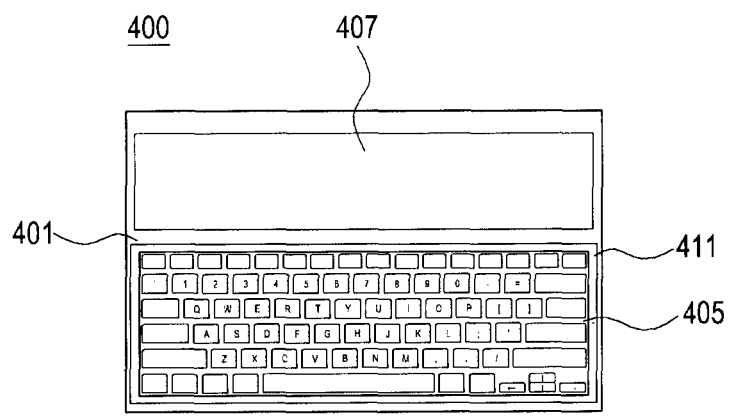
FIG. 5 is a plan view illustrating a protective cover according to yet another one of various embodiments of the present disclosure.

FIG. 5 is a plan view illustrating a protective cover according to yet another one of various embodiments of the present disclosure.

Referring to FIG. 5, a protective cover 400 according to yet another one of various embodiments of the present disclosure may include a first cover part 401, an input device 405, and a window part 407.

The first cover part 401 may have a coupling part 411 for surrounding the circumference of the input device 405 and fastening the input device 405. The coupling part 411 may be formed by a polymeric compound such as urethane. However, the coupling part 411 is not limited to the polymeric compound, and may be made of various materials having elasticity. The coupling part 411 may have elasticity and may be formed to correspond to the circumference of the input device 405 on the cover part 401 and inwardly fitted in the coupling part 411 such that the input key of the input device 405 may be exposed to the outside. Accordingly, a user may use the input device 405 mounted on the cover part 401 in a state in which the electronic device 10 (FIG. 1) is covered by the protective cover 400.

In contrast, when a user does not use the input device 405, after the input device 405 is separated from the first cover part 401 by outwardly pulling the coupling part 411 having elasticity, the input device 405 may be fitted in the coupling part 411 such that the input key of the input device 405 faces the first cover part 401. Thus, the input key of the input device 405 may be prevented from being inadvertently pushed.

Figure 6:
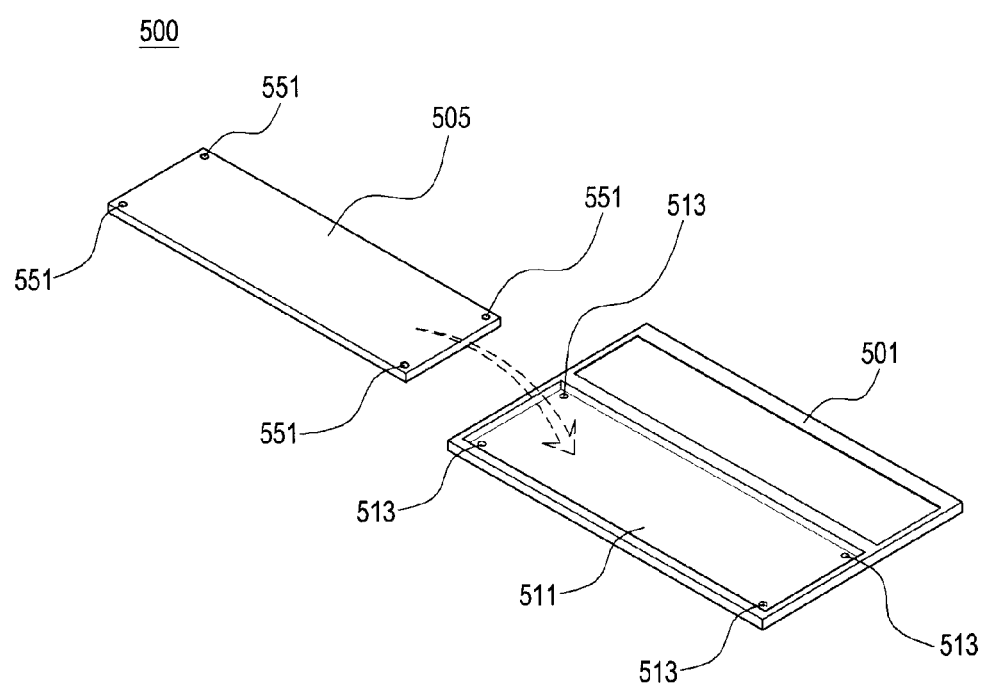
FIG. 6 is a perspective view illustrating a state in which an input device of the protective cover and a first cover part are detached from each other according to another one of various embodiments of the present disclosure.

FIG. 6 is a perspective view illustrating a state in which an input device of the protective cover and a first cover part are detached from each other according to another one of various embodiments of the present disclosure.

Referring to FIG. 6, a protective cover 500 according to yet another one of various embodiments of the present disclosure may include a first cover part 501, an input device 505, a window part 507, and a reception part 511 which are similar to the components of the above-described embodiment, and may further include a first magnetic part 551 and a second magnetic part 513.

The reception part 511 may be formed on the cover part 501 and may have a size corresponding to the input device 505 so as to receive the input device 505.

The first magnetic part 551 can be provided on the rear surface of the input device 505. For example, a surface opposite to the front surface on which the input key of the input device 505 is provided, and the second magnetic part 513 may be provided in the reception part 511 on the cover part 501. The second magnetic part 513 may be arranged at a location corresponding to the first magnetic part 513 in a state in which the input device 505 is received in the reception part 511. For example, when the first magnetic part 511 is arranged to be adjacent to an edge of the rear surface of the input device 505, the second magnetic part 513 may be arranged to be adjacent to an edge of the reception part 511. Further, for example, when the first magnetic part 551 has an N pole formed to be perpendicular to the rear surface of the input device 505, the second magnetic part 513 has an S pole formed to be perpendicular to the front surface of the first cover part 501. Alternatively, for example, when the first magnetic part 551 has an S pole formed to be perpendicular to the rear surface of the input device 505, the second magnetic part 513 has an N pole formed to be perpendicular to the front surface of the first cover part 501. Such first and second magnetic parts 513 and 551 may have poles opposite to each other such that when the first and second magnetic parts 513 and 551 are adjacent to each other, an attractive force may be generated.

In this way, when the input device 505 having the first magnetic part 551 is received in the reception part 511 having the second magnetic part 513, the input device 505 may be mounted to the first cover part 501 by the attractive force between the first magnetic part 551 and the second magnetic part 513. Further, a user can separate the input device 505 from the reception part 511 by an external force larger than the attractive force between the first and second magnetic parts 551 and 513.

Further, although not illustrated in the drawing, the first magnetic part 551 is arranged on the front surface of the input device 505 so that the first magnetic part 551 and the second magnetic part 513 can be attached to each other. Accordingly, the input device 505 can be mounted to the first cover part 501 such that the input key of the input device 505 is not exposed to the outside.

Figure 7:
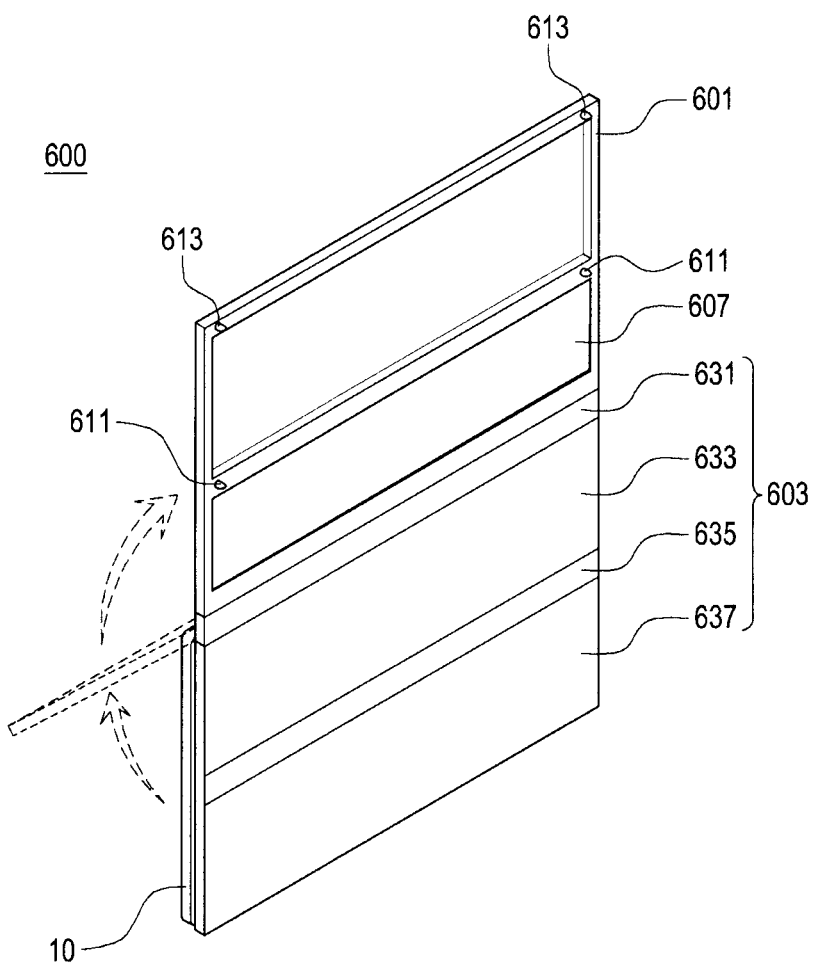
FIG. 7 and FIG. 8 are perspective views illustrating states in which first/second cover parts are rotated according to yet another one of various embodiments of the present disclosure.
Figure 8:
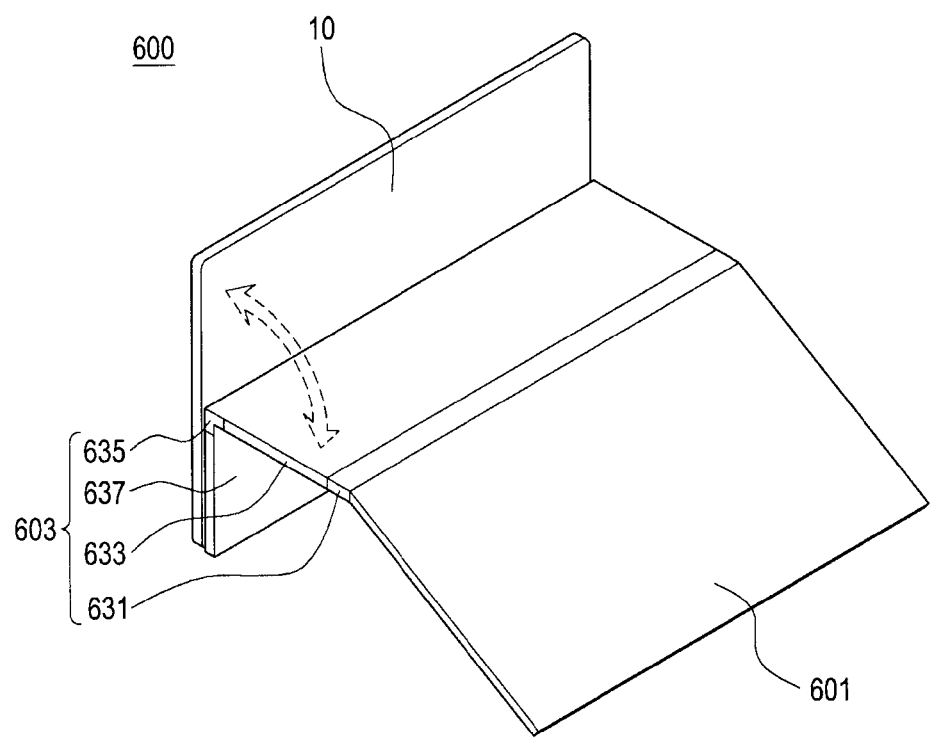
Figure 9:
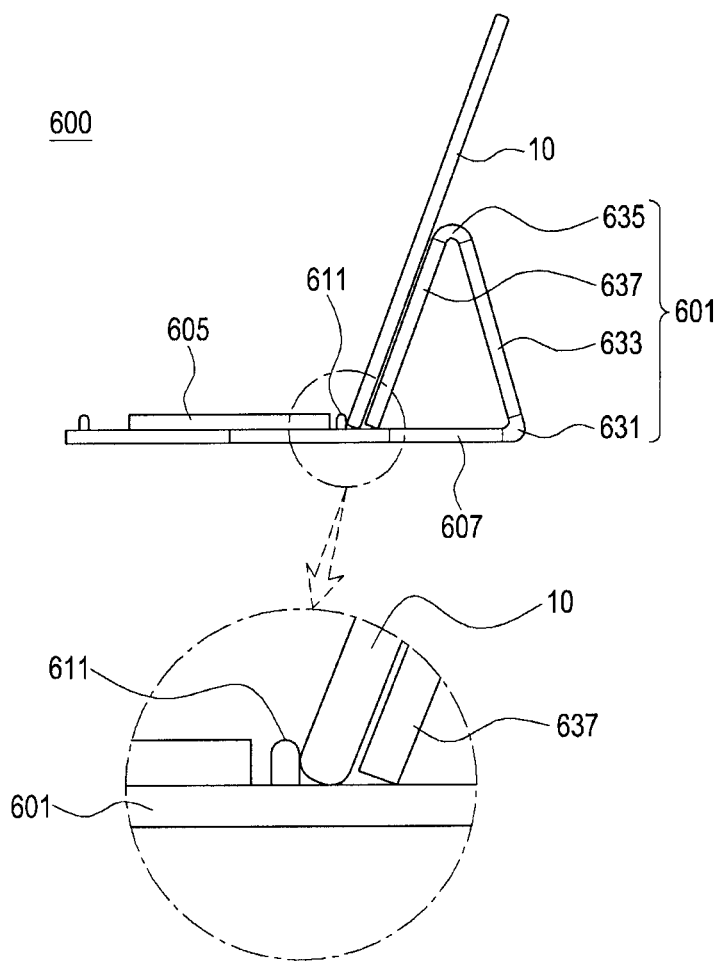
FIG. 9 is a side view illustrating a state in which an electronic device slantingly stands on the protective cover according to yet another one of various embodiments of the present disclosure and showing an enlarged view of an indicated area.
Figure 10:
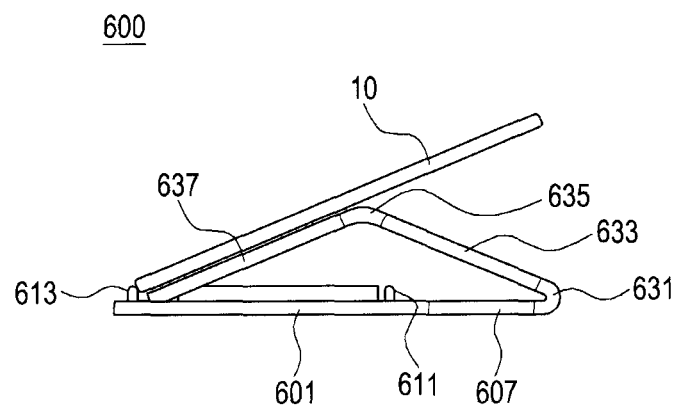
FIG. 10 is a side view illustrating a state in which the electronic device slantingly stands on the protective cover according to yet another one of various embodiments of the present disclosure.

FIGS. 7 and 8 are perspective views illustrating states in which first/second cover parts are rotated according to yet another one of various embodiments of the present disclosure. FIG. 9 is a side view illustrating a state in which an electronic device slantingly stands on the protective cover according to yet another one of various embodiments of the present disclosure. FIG. 10 is a side view illustrating a state in which the electronic device slantingly stands on the protective cover according to yet another one of various embodiments of the present disclosure.

Referring to FIGS. 7 to 10, a protective cover 600 according to yet another one of various embodiments of the present disclosure may include a first cover part 601, a second cover part 603, an input device 605, and a window part 607. In the present embodiment, a description of components similar to those of the above-described embodiment will be omitted.

The second cover part 603 may include an attachment/detachment part 637, a connection part 633, a first curved part 635, and a second curved part 631.

The attachment/detachment part 637 can protect a first part of the rear surface of the electronic device 10, for example, a part from a lower end of the rear surface of the electronic device 10 to a center thereof, and can be detached from the first part.

The connection part 633 may protect a second part corresponding to the remaining part of the rear surface of the electronic device 10 except for the first part, and may connect the attachment/detachment part 637 and the first cover part 603 to each other.

The first curved part 635 may be arranged between the attachment/detachment part 637 and the connection part 633 so as to rotatably connect the attachment/detachment part 637 and the connection part 633.

The second curved part 631 may be arranged between the connection part 633 and the first cover part 601 so as to rotatably connect the connection part 633 and the first cover part 601.

Rotation of the first cover part 601 and the second cover part 603 with respect to one another will be described below.

First, as illustrated in FIG. 7, the first cover part 601 can rotate about the second curved part 631 with respect to the connection part 633. Accordingly, the first cover part 601 can open the front surface of the electronic device 10.

Further, as illustrated in FIG. 8, the first cover part 601 can rotate toward the rear surface of the electronic device 10. At this time, the connection part 633 can rotate about the first curved part 635 with respect to the attachment/detachment part 637 together with the first cover part 601.

Finally, the first cover part 601 continuously rotates with respect to the connection part 633 and passes by the rear surface of the electronic device 10. Thereafter, as illustrated in FIG. 9, the first cover part 601 can be in contact with one end of the electronic device 10, for example, a lower end of the electronic device 10. Further, the attachment/detachment part 637, the connection part 633, and the first cover part 601 may support the rear surface of the electronic device 10 in a state in which the attachment/detachment part 637, the connection part 633, and the first cover part 601 are each in an inclined position relative to one another.

Further, the first cover part 601 may have holding parts 611 and 613 for holding the lower end of the electronic device 10. The holding parts 611 and 613 may have a first holding part 611 and a second holding part 613.

The first holding part 611 may protrude from the first cover part 601, and may be arranged between the input device 605 and the second curved part 631. The lower end of the electronic device 10 is held on the first holding part 611 so that the electronic device 10 can be arranged to be adjacent to the input device 605 and to be inclined with respect to the first cover part 601. Accordingly, a user can use the input device 605 while viewing the front surface of the electronic device 10.

The second holding part 613 may protrude from the first cover part 601, and may be arranged between one end of the first cover part 601 and the input device 605. However, the first and second holding parts are not limited to being arranged on the first cover part 601, and may instead or also be arranged on the input device 605. As illustrated in FIG. 10, the lower end of the electronic device 10 may be held on the second holding part 613 so that the electronic device 10 can be arranged to be inclined with respect to the first cover part 601 while concealing the input device 605. Accordingly, a user may view the front surface of the electronic device 10 at an angle that is different from that of the electronic device held on the first holding part 611. Further, the input device 605 may be used while being separated from the first cover part 601.

Figure 11:
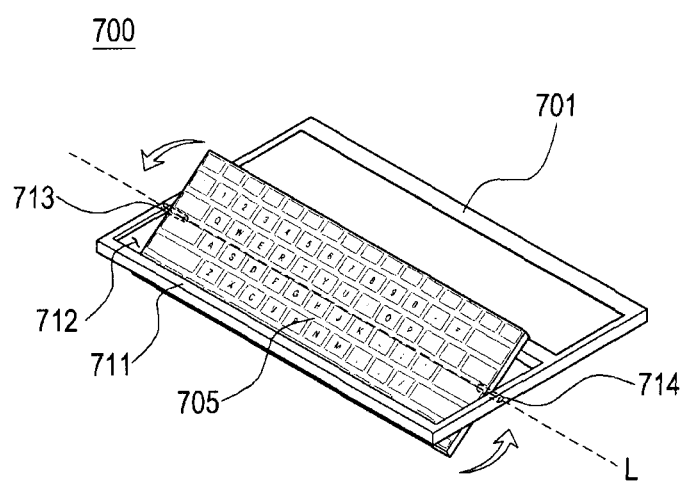
FIG. 11 is a perspective view illustrating a protective cover according to yet another one of various embodiments of the present disclosure.

FIG. 11 is a perspective view illustrating a protective cover according to yet another one of various embodiments of the present disclosure.

Referring to FIG. 11, a protective cover 700 according to yet another one of various embodiments of the present disclosure may include an opening part 712 and hinge parts 713 and 714 as well as a first cover part 701 and an input device 705 which are similar to those of the above-described embodiment.

The opening part 712 can be formed in the first cover part 701, may be configured and shaped to correspond to the input device 705 such that the input device 705 may be receive and positioned within the opening part 712.

The hinge parts 713 and 714 can be arranged in the opening part 711 and hinge-coupled to opposite sides of the input device 705. The hinge parts 713 and 714 may be placed on a virtual line L extending from the center of the input device 705 in a direction parallel to the lengthwise direction of the input device 705. Accordingly, the input device 705 can rotate on the opening part 712 while being engaged with the hinge parts 713 and 714.

Accordingly, a user may rotate the input device 705 on the opening part 712 to expose the input key of the input device 705 to the outside or rotate the input device 705 on the opening part 712 to conceal the input key of the input device 705.

Figure 12:
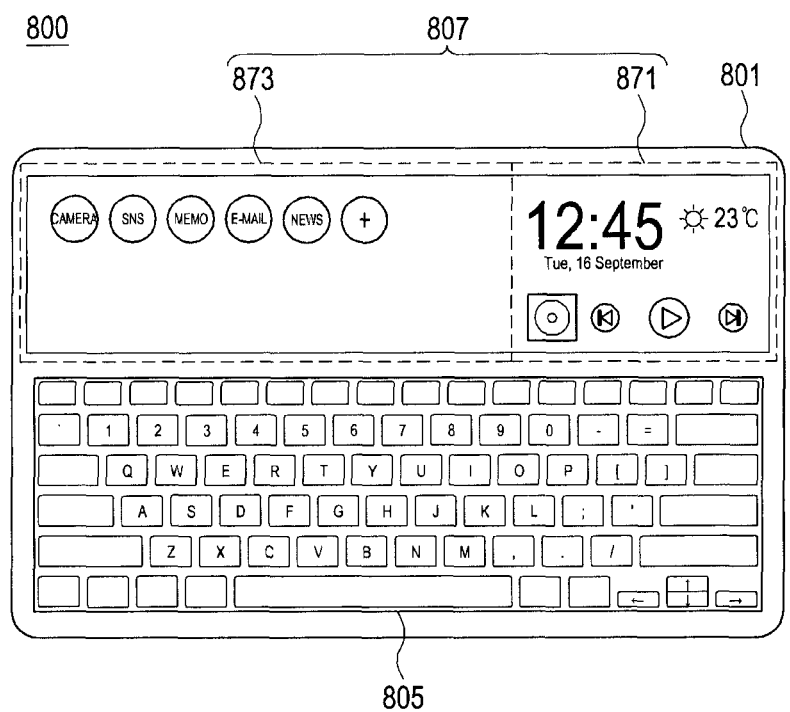
FIG. 12 is a view illustrating a state in which a function of the electronic device is provided through the window part while the protective cover covers the front surface and the rear surface of the electronic device.

FIG. 12 is a view illustrating a state in which a function of the electronic device is provided through the window part while the protective cover covers the front surface and the rear surface of the electronic device.

Referring to FIG. 12, a protective cover 800 according to various embodiments of the present disclosure may expose a part of the electronic device 10 (FIG. 1) through a window part 807 arranged in a first cover part 801 to the outside in a state in which the front surface and the rear surface of the electronic device 10 (FIG. 1) are surrounded, thereby enabling a user to use icons displayed through the window part 807.

The window part 807 may include a basic information region 871 for displaying basic information for a user, such as a time, weather, and music, and an icon selection region 873 for displaying icons to be selected by a user to perform functions thereof, such as a camera icon, an SNS icon, a memo icon, and a news icon.

The information displayed on the basic information region 871 or the icons displayed on the icon selection region 873 may be changed according to a setting of a user.

In this way, the protective cover 800 according to various embodiments of the present disclosure can provide a partial function of the electronic device to a user through the window part 807 at the same time while protecting the electronic device 10 (FIG. 1).

Figure 13:
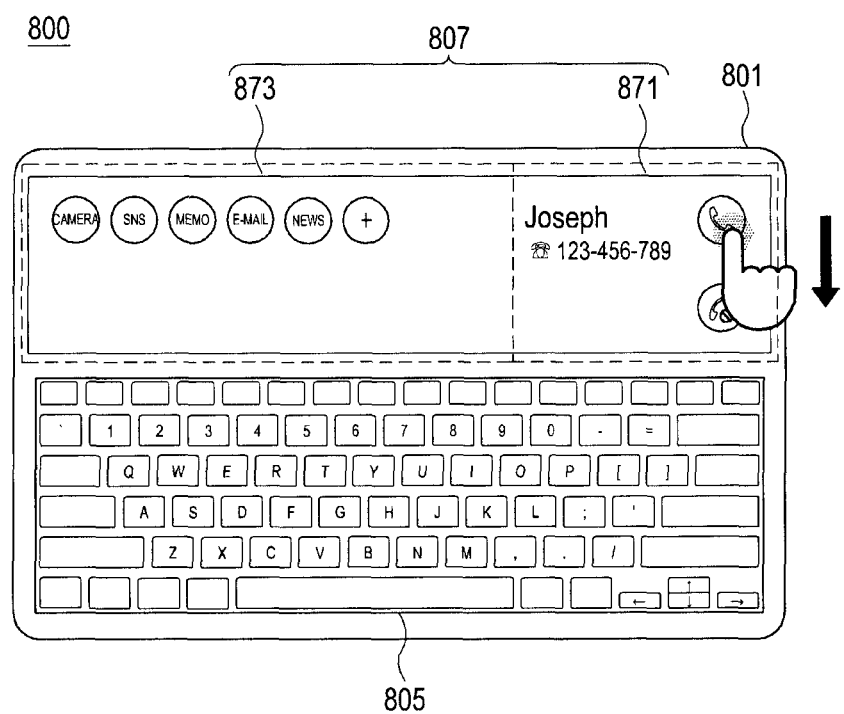
FIG. 13 is a view illustrating a state in which a call function of the electronic device is used through the window part illustrated in FIG. 12.

FIG. 13 is a view illustrating a state in which a call function of the electronic device is used through the window part illustrated in FIG. 12.

As illustrated in FIG. 13, when the electronic device receives a voice call, the information such as time and weather illustrated in FIG. 12 may disappear from the basic information region 871 and a phone number and a call reception icon of the received voice call may be displayed in the basic information region 871.

A user may push the call reception icon in one direction (e.g., downward direction) in a state in which the user clicks the call reception icon displayed on the basic information region 871, and thus, may answer the received voice call. Thus, the user may use a voice call function of the electronic device without opening the protective cover.

Further, the user can use an icon displayed on the icon selection region 873 while receiving a voice call. For example, the user may record phone conversation contents by clicking, or otherwise selecting, the memo icon during the voice call through the electronic device. At this time, the user may input the phone conversation contents via a keyboard 805.

Meanwhile, the call reception icon is not limited to be displayed on the basic information region 871, and may be displayed on the icon selection region 873.

Figure 14:
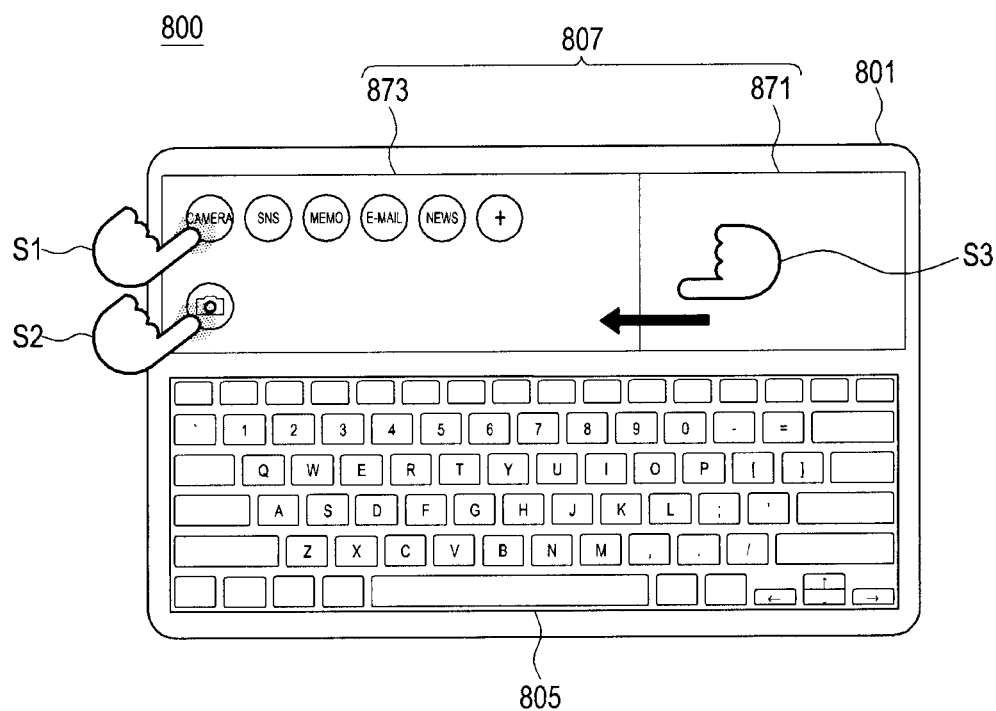
FIG. 14 is a view illustrating a state in which a camera function of the electronic device is used through the window part illustrated in FIG. 12.

FIG. 14 is a view illustrating a state in which a camera function of the electronic device is used through the window part illustrated in FIG. 12.

Referring to FIG. 14, the user may select or click the camera icon displayed on the icon selection region 873 (S1) so that a photographing icon can be displayed on the icon selection region 873 while the camera module of the electronic device is activated. Further, the user can acquire a picture image by clicking the photographing icon (S2). The picture image may be displayed on the basic information region 871.

Figure 15:
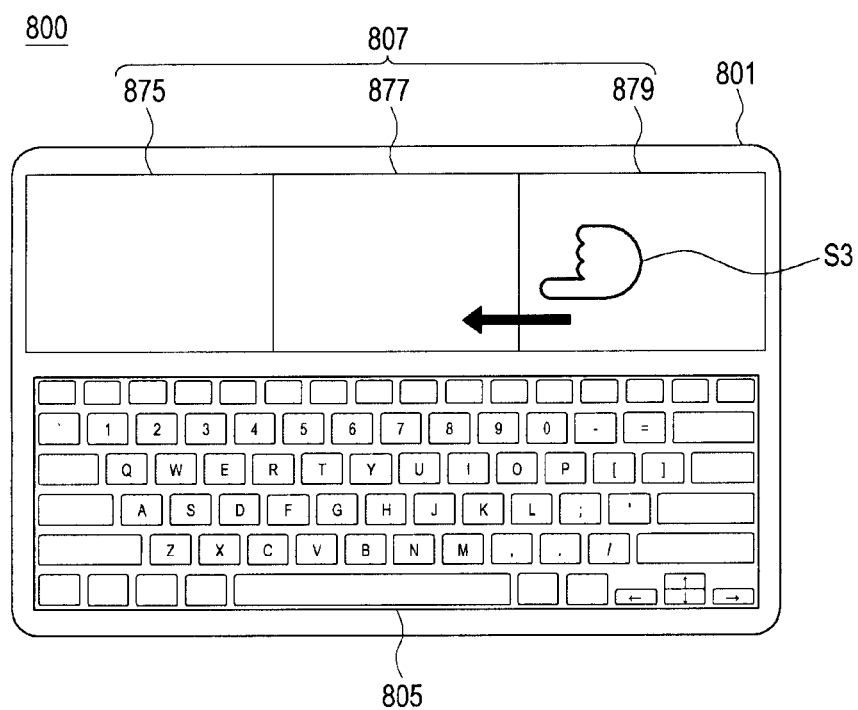
FIG. 15 is a view illustrating a state in which the window part is divided to display a picture image acquired in FIG. 14.

FIG. 15 is a view illustrating a state in which the window part is divided to display a picture image acquired in FIG. 14.

Referring to FIG. 15, when a user pushes the basic information region 871 (FIG. 14) towards the icon selection region 873 (FIG. 14) while clicking the basic information region 871 (FIG. 14) (S3), the window part 807 can be divided into first, second, and third image regions 875, 877, and 879. The acquired picture images may be displayed on the first, second, and third image regions 875, 877 and 879. Further, as the user repeatedly clicks and pushes one of the first, second, and third image regions 875, 877 and 879, other acquired picture images can be displayed on the first, second, and third image regions 875, 877, and 879.

Figure 16:
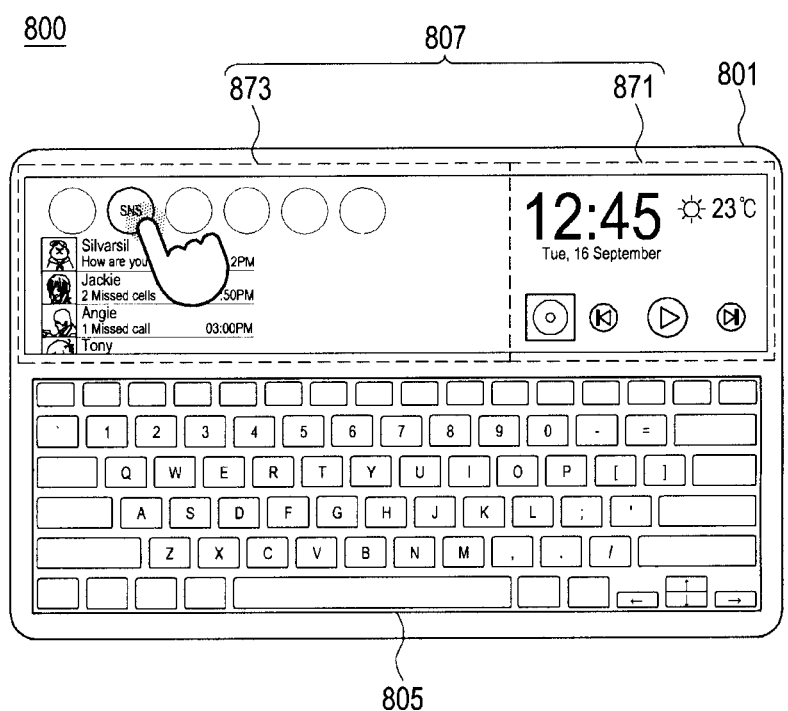
FIG. 16 and FIG. 17 are views illustrating a state in which an SNS function of the electronic device is used through the window part illustrated in FIG. 12.
Figure 17:
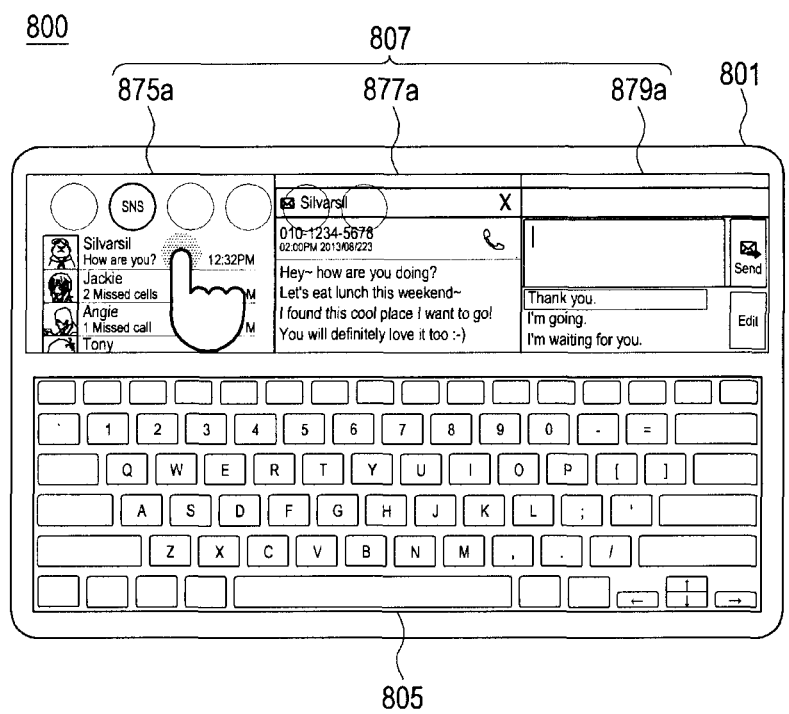

FIGS. 16 and 17 are views illustrating a state in which an SNS function of the electronic device is used through the window part illustrated in FIG. 12.

Referring to FIG. 16, when a user clicks an SNS icon displayed on the icon selection region 873, a list of friends registered in an SNS can be displayed on the icon selection region 873.

For example, as shown in FIG. 17, when the user selects and clicks one of friends belonging to the list, a friend list region 875a, a reception content display region 877a, and an input window region 879a can be divisionally displayed in the window part 807. A message content or a phone number of the selected friend can be displayed on the reception content display region 877a. A content input through the keyboard 805 by the user can be displayed on the input window region 879a. Further, a frequently-used phrase or a phrase corresponding to the message content displayed on the reception content display region 877a can be displayed on the input window region 879a. For example, when a message content "Will you wait? Or will you leave first?" is displayed on the reception content display region 877a, a phrase "I will leave first" or a phrase "I will wait" corresponding to the message content displayed on the reception content region 877a are displayed on the input window region 879a so that the user can select one of the phrases.

Figure 18:
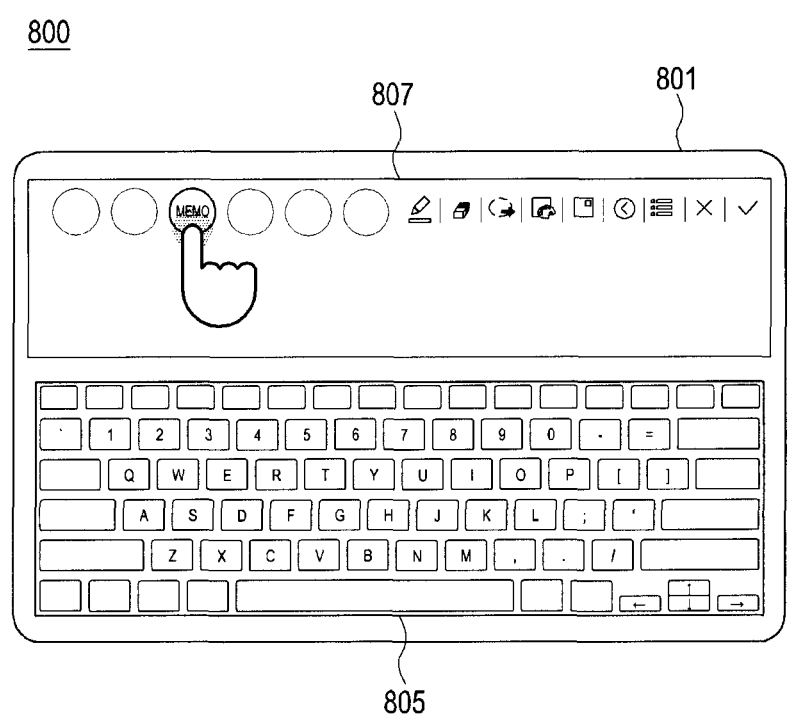
FIG. 18 is a view illustrating a state in which a memo function of the electronic device is used through the window part illustrated in FIG. 12.

FIG. 18 is a view illustrating a state in which a memo function of the electronic device is used through the window part illustrated in FIG. 12.

Referring to FIG. 18, when a user selects a memo icon displayed on the icon selection region 873 (FIG. 12), various icons used for the memo function, such as a font icon, eraser icon, and a storage icon, may be activated on the window part 807 and the user can write a memo on the window part 807 through the keyboard 805. Thus, the user can use the memo function of the electronic device using the window part 807 and the keyboard 805 without opening the protective cover 800.

Figure 19:
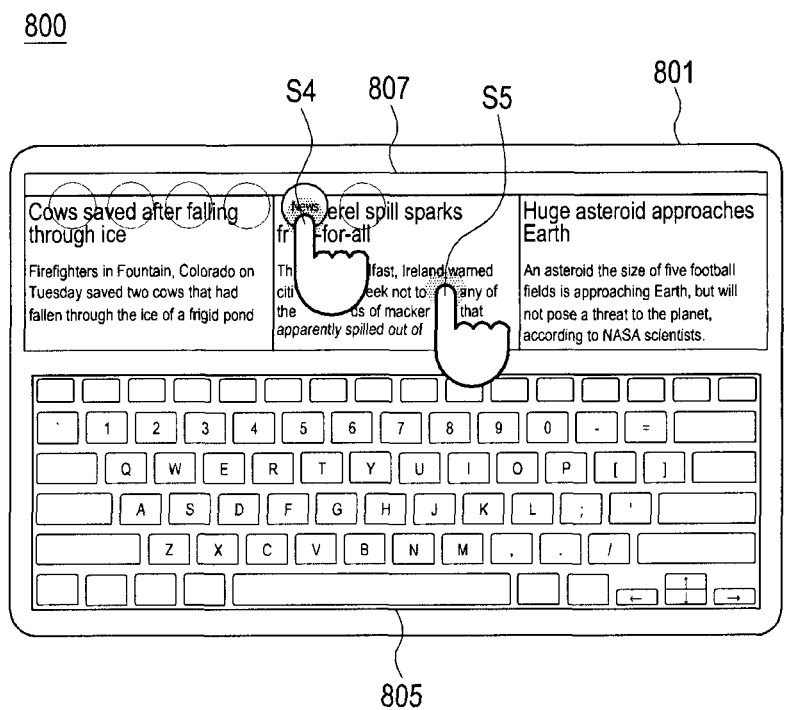
FIG. 19 is a view illustrating a state in which a news function of the electronic device is used through the window part illustrated in FIG. 12.

FIG. 19 is a view illustrating a state in which a news function of the electronic device is used through the window part illustrated in FIG. 12.

Referring to FIG. 19, when a user clicks a news icon displayed on the icon selection region 873 (FIG. 12) (S4), a headline of news or a part of the news may be displayed on the window part 807, for example, on each of parts divided within the window part 807. Further, when the user clicks and selects one of the divided parts (S5), a current screen is moved to a web site on which the selected news is provided or the full text of the selected news can be displayed on the window part 807.

Figure 20:
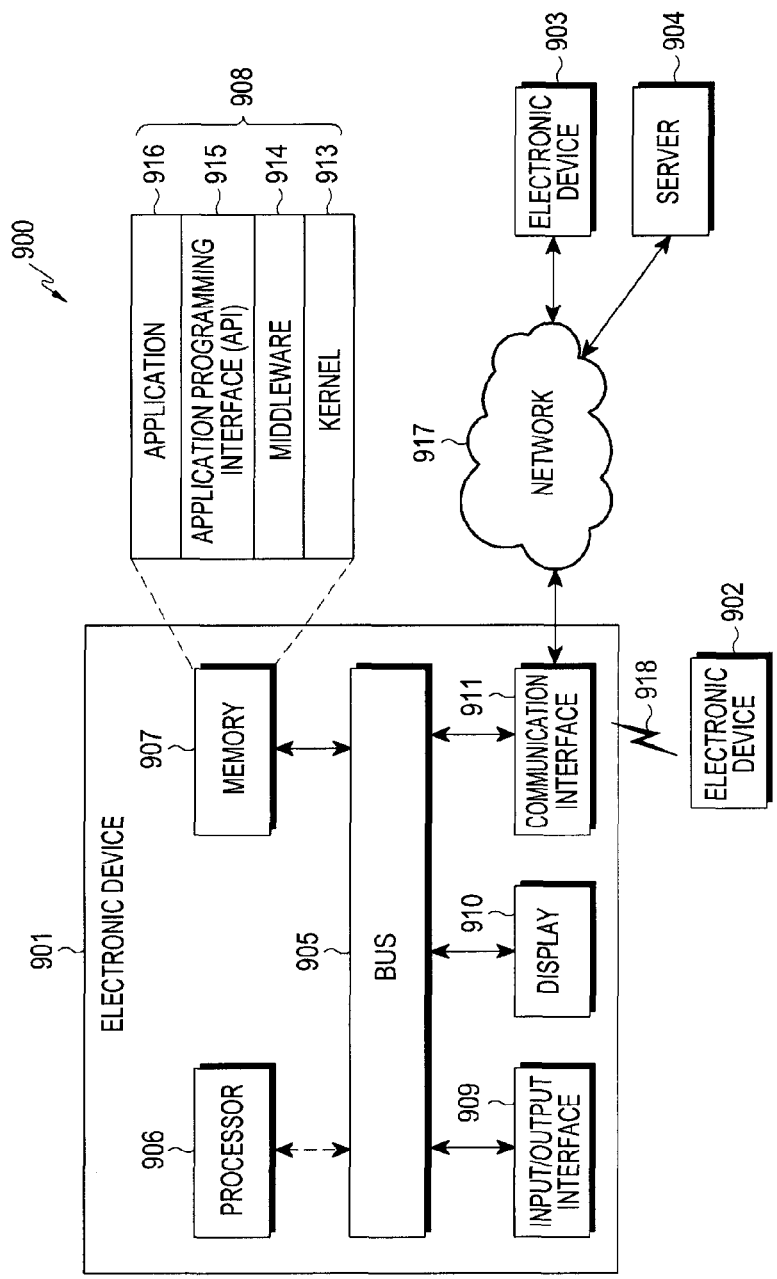
FIG. 20 illustrates a network environment in which an electronic device operates according to various embodiments of the present disclosure.

FIG. 20 illustrates a network environment in which an electronic device operates according to various embodiments of the present disclosure.

The electronic device according to various embodiments of the present disclosure may interwork with various electronic devices as described below. For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to some embodiments, the electronic device may be a smart home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™, a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments of the present disclosure will be described with reference to the accompanying drawings. As used herein, the term "user" may indicate a person who uses an electronic device or a device (e.g., an artificial intelligence electronic device) that uses an electronic device.

Referring to FIG. 20, an electronic device within a network environment 900 according to various embodiments will be described. An electronic device 901 may include a bus 905, a processor 906, a memory 907, an input/output interface 909, a display 910, and a communication interface 911. In some embodiments, the electronic device 901 may omit at least one of the above components or additionally include other components.

The bus 905 may include, for example, a circuit for connecting the components 905 to 911 to each other and transferring communication (for example, a control message and/or data) between the components.

The processor 906 may include one or more of a Central Processing Unit (CPU), an Application Processor (AP), and a Communication Processor (CP). The processor 906 may control, for example, one or more other components of the electronic device 901 and/or process calculation or data related to communication.

The memory 907 may include a volatile memory and/or a non-volatile memory. The memory 907 may store, for example, instructions or data related to at least one other component of the electronic device 901. According to an embodiment, the memory 907 may store software and/or a program 908. The program 908 may include, for example, a kernel 913, middleware 914, an Application Programming Interface (API) 915, and/or an application program (or "application") 916. At least some of the kernel 913, the middleware 914, and the API 915 may be referred to as an Operating System (OS).

The kernel 913 can, for example, control or manage system resources (e.g., the bus 905, the processor 906, the memory 907, etc.) used for executing an operation or function implemented by the other programs (e.g., the middleware 914, the API 915, or the application program 916). Further, the kernel 913 may provide an interface through which the middleware 914, the API 915, or the application program 916 may access individual components of the electronic device 901 to control or manage system resources.

The middleware 914 can, for example, serve as a relay for allowing the API 915 or the application program 916 to communicate with the kernel 913 to exchange data. Further, with regard to task requests received from the application program 916, the middleware 914 may, for example, make a control (e.g., scheduling or load balancing) for the task requests using a method of assigning at least one application a priority for using the system resources (e.g., the bus 905, the processor 906, or the memory 907) of the electronic device 901.

The API 915 is, for example, an interface through which the applications 916 control functions provided from the kernel 913 or the middleware 914, and may include, for example, at least one interface or function (for example, instructions) for file control, window control, image processing, or text control.

The input/output interface 909 can, for example, serve as an interface through which commands or data input from the user or another external device can be transmitted to other component(s) of the electronic device 901. Further, the input/output interface 909 can output instructions or data received from another component(s) of the electronic device 901 to a user or another external device.

The display 910 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 910 can display various types of contents (for example, text, images, videos, icons, or symbols) for users. The display 910 may include a touch screen and can, for example, receive a touch input, a gesture input, a proximity input, or a hovering input using an electronic pen or a user's body part.

For example, the communication interface 911 can configure communication between the electronic device 901 and an external device (for example, a first electronic device 902, a second electronic device 903, or a server 904). For example, the communication interface 911 can be connected to a network 917 through wireless or wired communication to communicate with the external device (for example, the external electronic device 903 or the server 904).

The wireless communication can use, for example, at least one of LTE, LTE-A, CDMA, WCDMA, UMTS, WiBro, and GSM, for example, as a cellular communication protocol. The wired communication may include, for example, at least one of a Universal Serial Bus (USB), a High Definition Multimedia Interface (HDMI), Recommended Standard 232 (RS-232), and a Plain Old Telephone Service (POTS). The network 917 may include at least one of communication networks such as a computer network (for example, a LAN or a WAN), the Internet, and a telephone network.

Each of the first and second external electronic devices 902 and 903 may be a device which is the same as or different from the electronic device 901. According to an embodiment, the server 904 may include a group of one or more servers. According to various embodiments, all or some of the operations performed in the electronic device 901 can be executed in another electronic device or a plurality of electronic devices (e.g., the electronic devices 902 and 903 or the server 904). According to an embodiment, when the electronic device 901 should perform some functions or services automatically or in response to a request, the electronic device 901 can make a request for performing at least some functions relating thereto to another device (e.g., the electronic device 902 or 903 or the server 904) instead of performing the functions or services by itself or additionally. The other electronic device (for example, the electronic device 902 or 903 or the server 904) can execute the requested function or the additional function and transfer the result obtained by executing the function to the electronic device 901. The electronic device 901 can process the received result as it is or additionally to provide the requested functions or services. To this end, for example, cloud computing, distributed computing, or client-server computing technology may be used.

Figure 21:
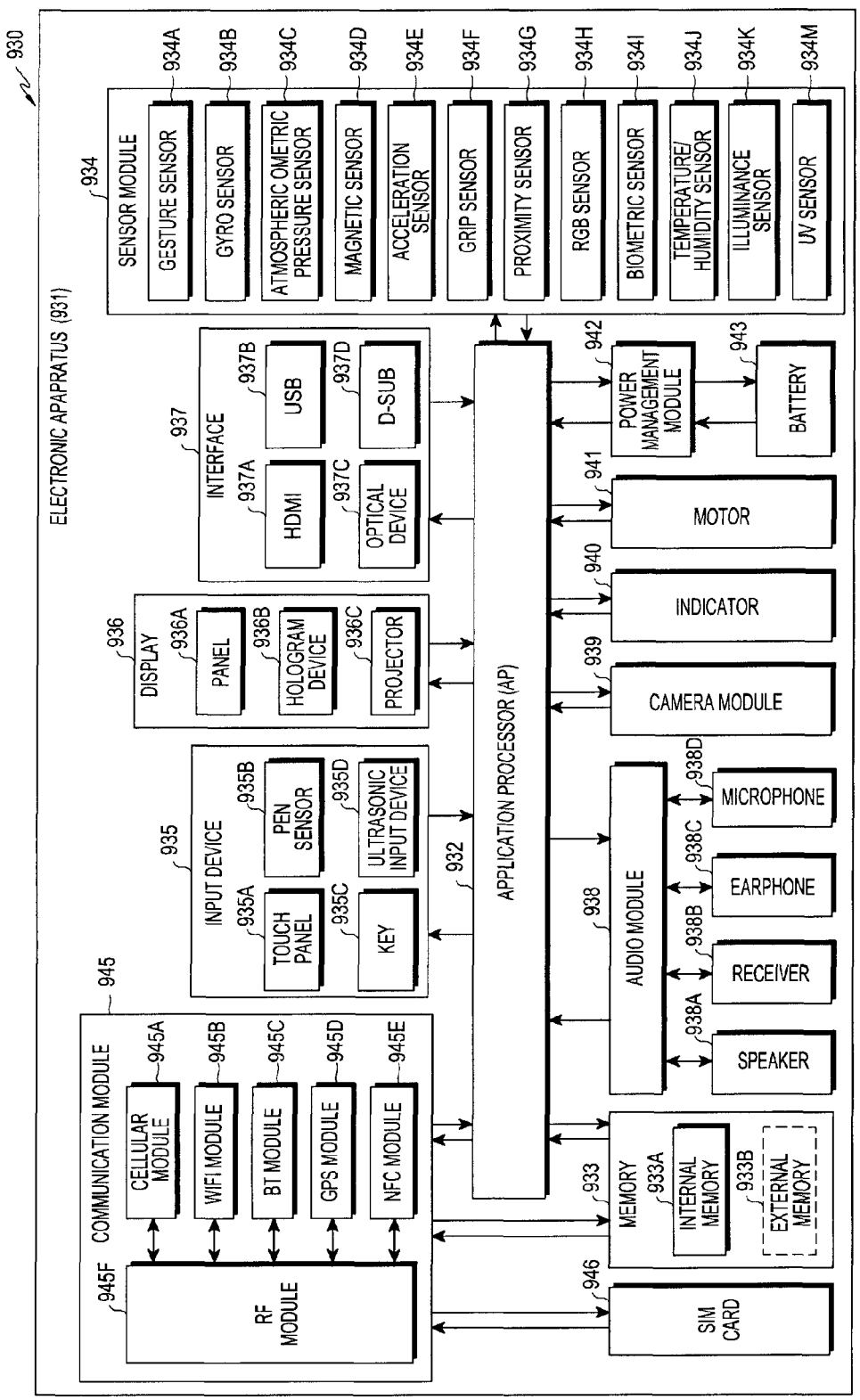
FIG. 21 is a block diagram illustrating an electronic device according to various embodiments of the present disclosure.

FIG. 21 is a block diagram 930 illustrating an electronic device 930 according to various embodiments of the present disclosure. The electronic device 931 may include, for example, all or some of the electronic device 901 illustrated in FIG. 20. The electronic device 931 may include at least one Application Processor (AP) 932, a communication module 945, a Subscriber Identification Module (SIM) card 946, a memory 933, a sensor module 934, an input device 935, a display 936, an interface 937, an audio module 938, a camera module 939, a power management module 942, a battery 943, an indicator 940, and a motor 941.

The AP 932 can, for example, control a plurality of hardware or software components connected thereto by operating an operating system or an application program and perform a variety of data processing and calculations. The AP 932 may be embodied as, for example, a System on Chip (SoC). According to an embodiment of the present disclosure, the AP 932 may further include a Graphical Processing Unit (GPU) and/or an image signal processor. The AP 932 may include at least some of the components (for example, a cellular module 945A) illustrated in FIG. 21. The AP 932 can load instructions or data, received from at least one other component (for example, a non-volatile memory), in a volatile memory to process the loaded instructions or data, and can store various types of data in a non-volatile memory.

The communication module 945 may have a configuration equal or similar to the communication interface 910 of FIG. 20. The communication module 945 may include, for example, a cellular module 945A, a Wi-Fi module 945B, a BT module 945C, a GPS module 945D, an NFC module 945E, and a Radio Frequency (RF) module 945F.

The cellular module 945A can, for example, provide a voice call, a video call, a text message service or an Internet service through a communication network. According to an embodiment, the cellular module 945A may distinguish and authenticate the electronic device 931 within a communication network using a subscriber identification module (for example, the SIM card 946). According to an embodiment of the present disclosure, the cellular module 945A can perform at least some of the functions which can be provided by the AP 932. According to an embodiment, the cellular module 945A may include a Communication Processor (CP).

Each of the Wi-Fi module 945B, the BT module 945C, the GPS module 945D, or the NFC module 945E may include, for example, a processor for processing data transmitted/received through the corresponding modules. According to any embodiment, at least some (two or more) of the cellular module 945A, the Wi-Fi module 945B, the BT module 945C, the GPS module 945D, and the NFC module 945E may be included in one Integrated Chip (IC) or IC package.

The RF module 945F can, for example, transmit/receive a communication signal (for example, an RF signal). The RF module 945F may include, for example, a transceiver, a Power Amp Module (PAM), a frequency filter, a Low Noise Amplifier (LNA) or an antenna. According to another embodiment, at least one of the cellular module 945A, the Wi-Fi module 945B, the BT module 945C, the GPS module 945D, and the NFC module 945E can transmit/receive an RF signal through a separate RF module.

The SIM card 946 may include a card including a subscriber identification module and/or an embedded SIM, and contain unique identification information (for example, an Integrated Circuit Card Identifier (ICCID)) or subscriber information (for example, an International Mobile Subscriber Identity (IMSI)).

The memory 933 may include, for example, an internal memory 1522 and an external memory 1524. The internal memory 933A may include at least one of, for example, a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash memory (for example, a NAND flash memory or a NOR flash memory), a hard driver, or a Solid State Drive (SSD).

The external memory 933B may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 933B can be functionally and/or physically connected to the electronic device 931 through various interfaces.

The sensor module 934 can, for example, measure a physical quantity or detect an operation state of the electronic device 931 to convert the measured or detected information to an electrical signal. The sensor module 934 may include at least one of, for example, a gesture sensor 934A, a gyro sensor 934B, an atmospheric pressure sensor 934C, a magnetic sensor 934D, an acceleration sensor 934E, a grip sensor 934F, a proximity sensor 934G, a color sensor 934H (for example, a Red/Green/Blue (RGB) sensor), a biometric sensor 934I, a temperature/humidity sensor 934J, an illumination sensor 934K, and an Ultra Violet (UV) sensor 934M. Additionally or alternatively, the sensor module 934 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 934 may further include a control circuit for controlling at least one sensor included therein. In any embodiment, the electronic device 931 may further include a processor configured to control the sensor module 934 as a part of or separately from the AP 932, and can control the sensor module 934 while the AP 932 is in a sleep state. The magnetic sensor 934D can be provided to be adjacent to the display device of the electronic device 10 (FIG. 1). Further, the protective cover 100 (FIG. 1) includes a conductor corresponding to the magnetic sensor 934D so as to determine whether the protective cover 100 (FIG. 1) covers the electronic device 10 (FIG. 1) using the magnetic sensor 934D. When a state in which the protective cover 100 (FIG. 1) covers the electronic device 100 (FIG. 1) is detected through the magnetic sensor 934D, the AP can switch the electronic device to a sleep mode. At the same time, the AP can activate a part of the display device corresponding to the window part 107 (FIG. 1). However, the part of the display device corresponding to the window part 107 (FIG. 1) is activated on the basis of a user's demand, e.g., a touch input in which a touch state is maintained for a predetermined time period.

The input device 935 may include, for example, a touch panel 935A, a (digital) pen sensor 935B, a key 935C, or an ultrasonic input device 935D. The touch panel 935A can use at least one of, for example, a capacitive type, a resistive type, an infrared type, and an ultrasonic type. The touch panel 935A may further include a control circuit. The touch panel 935A may further include a tactile layer, and provide a tactile reaction to a user.

The (digital) pen sensor 935B may include, for example, a recognition sheet which is a part of the touch panel or a separate recognition sheet. The key 935C may include, for example, a physical button, an optical key or a keypad. The ultrasonic input unit 935D can input data through an input means that generates an ultrasonic signal, and the electronic device 931 can identify data by detecting a sound wave with a microphone (for example, a microphone 938D).

The display 936 (e.g., the display 910) may include a panel 936A, a hologram device 936B, or a projector 936C. The panel 936A may include a component equal or similar to the display 910 of FIG. 20. The panel 936A may be implemented to be, for example, flexible, transparent, or wearable. The panel 936A can also be configured to be integrated with the touch panel 1752 as a single module. The hologram device 936B can show a stereoscopic image in the air by using interference of light. The projector 936C may project light onto a screen to display an image. For example, the screen can be located inside or outside the electronic device 931. According to an embodiment, the display 936 may further include a control circuit for controlling the panel 936A, the hologram device 936B or the projector 936C.

The interface 937 may include, for example, a High-Definition Multimedia Interface (HDMI) 937A, a Universal Serial Bus (USB) 937B, an optical interface 937C, or a D-subminiature (D-sub) 937D. The interface 937 may be included in, for example, the communication interface 910 illustrated in FIG. 20. Additionally or alternatively, the interface 937 may include, for example, a Mobile High-definition Link (MHL) interface, a Secure Digital (SD) card/Multi-Media Card (MMC) interface, or an Infrared Data Association (IrDA) standard interface.

The audio module 938 can bilaterally convert, for example, a sound and an electrical signal. At least some components of the audio module 938 may be included in, for example, the input/output interface 908 illustrated in FIG. 38. The audio module 938 can process sound information which is input or output through, for example, a speaker 938A, a receiver 938B, an earphone 938C, a microphone 938D or the like.

The camera module 939 is a device which can photograph a still image and a moving image. According to an embodiment, the camera module 939 may include one or more image sensors (for example, a front sensor or a rear sensor), a lens, an Image Signal Processor (ISP) or a flash (for example, an LED or a xenon lamp).

The power management module 942 can, for example, manage power of the electronic device 931. According to an embodiment, the power management module 942 may include a Power Management Integrated Circuit (PMIC), a charger Integrated Circuit (IC), or a battery or fuel gauge. The PMIC may have a wired and/or wireless charging scheme. Examples of the wireless charging method may include, for example, a magnetic resonance method, a magnetic induction method, an electromagnetic method, and the like, and may further include additional circuits (e.g., a coil loop, a resonance circuit, a rectifier, etc.) for wireless charging. The battery gauge can, for example, measure a residual amount of battery 943, a charging voltage and current, or temperature. The battery 943 may include, for example, a rechargeable battery and/or a solar battery.

The indicator 940 can display a particular status of the electronic device 931 or a part thereof (for example, the AP 932), for example, a booting status, a message status, a charging status, or the like. The motor 941 can convert an electrical signal into mechanical vibrations, and can generate a vibration or haptic effect. Although not illustrated, the electronic device 931 may include a processing device (for example, a GPU) for supporting mobile TV. The processing device for supporting mobile TV can process media data according to a standard of Digital Multimedia Broadcasting (DMB), Digital Video Broadcasting (DVB), media flow or the like.

Each of the components of the electronic device according to the present disclosure may be implemented by one or more components and the name of the corresponding component may vary depending on a type of the electronic device. In various embodiments, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination.

Figure 22:
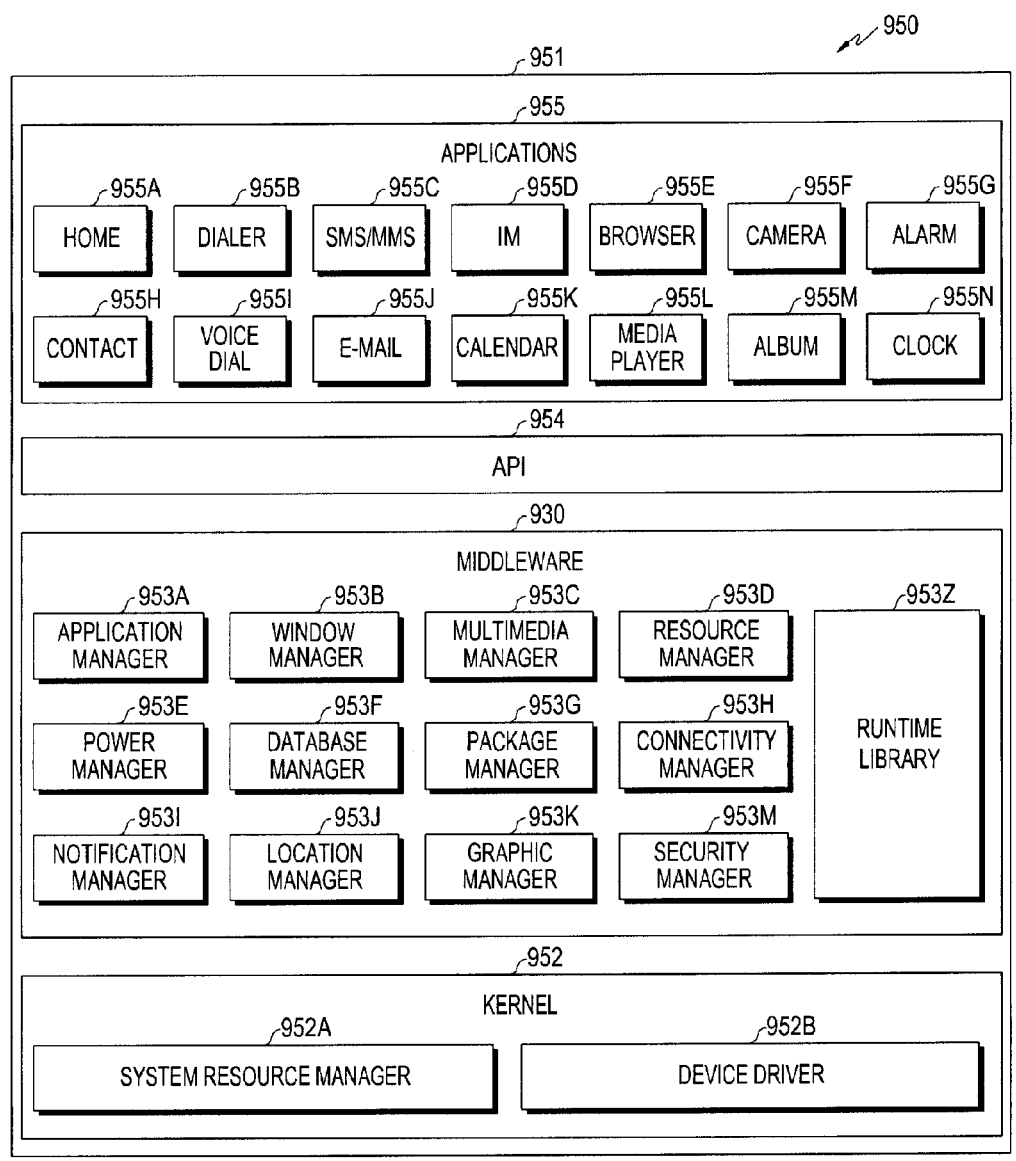
FIG. 22 is a block diagram illustrating a program module according to various embodiments.

FIG. 22 is a block diagram 950 illustrating a program module 951 according to various embodiments of the present disclosure. According to an embodiment, the program module 951 (for example, the program 908 in FIG. 20) may include an Operating System (OS) for controlling resources related to the electronic device (for example, the electronic device 901 in FIG. 20) and/or various applications (for example, the application program 916 in FIG. 20) executed on the OS. The OS may be, for example, Android, iOS, Windows, Symbian, Tizen, Bada, or the like.

The program module 951 may include a kernel 952, middleware 953, an API 954, and/or an application 955. At least some of the program module 951 may be preloaded on the electronic device or downloaded from a server (for example, the server 904 in FIG. 20).

The kernel 952 (e.g., the kernel 913 in FIG. 20) may include, for example, a system resource manager 952A and/or a device driver 952B. The system resource manager 952A can control, allocate, or collect the system resources. According to an embodiment, the system resource manager 952A may include a process manager, a memory manager, or a file system manager. The device driver 952B may include, for example, a display driver, a camera driver, a Bluetooth driver, a shared-memory driver, a USB driver, a keypad driver, a Wi-Fi driver, an audio driver, or an Inter-Process Communication (IPC) driver.

The middleware 953 can provide a function required by the applications 955 in common or provide various functions to the applications 955 through the API 954 so that the applications 955 can efficiently use limited system resources of the electronic device. According to an embodiment, the middleware 953 (e.g., the middleware 914 in FIG. 20) may include, for example, at least one of a runtime library 953Z, an application manager 953A, a window manager 953B, a multimedia manager 953C, a resource manager 953D, a power manager 953E, a database manager 953F, a package manager 953G, a connectivity manager 953H, a notification manager 953I, a location manager 953J, a graphic manager 953K, and a security manager 953M.

The run-time library 953Z may include, for example, a library module that a compiler uses in order to add new functions through a programming language while the application 955 is executed. The run-time library 953Z may perform input/output management, memory management, or a function for an arithmetic function.

The application manager 953A can, for example, manage a life cycle of at least one application among the applications 955. The window manager 953B can manage GUI resources used on the screen. The multimedia manager 953C can identify a format required for reproduction of various media files, and can encode and decode the media file by using a COder/DECoder (CODEC) suitable for the corresponding format. The resource manager 953D can manage resources such as a source code, a memory, or a storage space of at least one of the applications 955.

The power manager 953E can operate together with, for example, a Basic Input/Output System (BIOS), so as to manage a battery or power and can provide power information required for the operation of the electronic device. The database manager 953F may generate, search for, or change a database to be used by at least one of the applications 955. The package manager 953G can manage installation or an update of an application distributed in a form of a package file.

For example, the connectivity manager 953H can manage wireless connections such as Wi-Fi or Bluetooth. The notification manager 953I can display or notify of an event such as an arrival message, an appointment, proximity notification, and the like in such a manner that a user is not disturbed. The location manager 953J can manage location information of the electronic device. The graphic manager 953K can manage a graphic effect to be provided to a user and a user interface related to the graphic effects. The security manager 953M may provide various security functions required for system security or user authentication. According to an embodiment, when the electronic device (for example, electronic device 901 in FIG. 20) has a call function, the middleware 953 may further include a telephony manager for managing a voice call function or a video call function of the electronic device.

The middleware 953 may include a middleware module for forming a combination of various functions of the aforementioned components. The middleware 953 may provide a module specialized for each type of operating system in order to provide a differentiated function. In addition, a few existing components may be dynamically removed from the middleware 953, or new components may be added to the middleware 230.

The API 954 (for example, the API 915 in FIG. 20), which is a set of API programming functions, can be provided in a different configuration for each operating system. For example, in the case of Android or iOS, one API set may be provided for each platform. In the case of Tizen, two or more API sets may be provided for each platform.

The application 955 (e.g., the application program 916 in FIG. 20) may include, for example, one or more applications which can provide functions such as a home function 955A, a dialer 955B, an SMS/MMS 955C, an Instant Message (IM) 955D, a browser 955E, a camera 955F, an alarm 955G, a contact 955H, a voice dialer 955I, an E-mail 955J, a calendar 955K, a media player 955L, an album 955M, a clock 955N, a health care (e.g., measurement of exercise quantity or blood sugar), or provision of environment information (e.g., atmospheric pressure, humidity, or temperature information).

According to an embodiment, the applications 955 may include an application (hereinafter, referred to as an "information exchange application" for convenience of description) supporting information exchange between the electronic device (e.g., the electronic device 901 in FIG. 20) and an external electronic device (e.g., the electronic device 902 or 903 in FIG. 20). The information exchange application may include, for example, a notification relay application for transmitting specific information to the external electronic device, or a device management application for managing the external electronic device.

For example, the notification relay application may include a function of transferring, to the external electronic device (for example, the electronic device 902 or 903), notification information generated by other applications of the electronic device 101 (for example, an SMS/MMS application, an E-mail application, a health management application, or an environmental information application). Further, the notification relay application can, for example, receive notification information from the external electronic device and provide the received notification information to a user. The device management application may, for example, manage (e.g., install, delete, or update) at least one function of the external electronic device (e.g., the electronic devices 102 and 104) communicating with the electronic device (e.g., turning on/off the external electronic device itself (or some elements thereof) or adjusting brightness (or resolution) of a display), applications executed in the external electronic device, or services provided from the external electronic device (e.g., a telephone call service or a message service).

According to an embodiment, the applications 955 may include an application (for example, a health management application) designated according to attributes (for example, attributes of the electronic device such as the type of electronic device which corresponds to a mobile medical device) of the external electronic device (for example, the electronic device 902 or 903 in FIG. 20). According to an embodiment, the applications 955 may include an application received from the external electronic devices (e.g., the server 904 in FIG. 20) or the electronic device 902 or 903 in FIG. 20. According to an embodiment, the applications 955 may include a preloaded application or a third party application which can be downloaded from the server. Names of the elements of the program module 951, according to the above-described embodiments of the present disclosure, may change depending on the type of OS.

According to various exemplary embodiments of the present disclosure, at least some of the program module 951 may be implemented in software, firmware, hardware, or a combination of two or more thereof. At least some of the programming module 951 may be implemented (for example, executed) by, for example, the processor (for example, the AP 932). At least some of the programming module 951 may include, for example, a module, program, routine, sets of instructions, process, or the like for performing one or more functions.

The "module" used in various embodiments of the present disclosure may refer to, for example, a "unit" including one of hardware, software, and firmware, or a combination of two or more of the hardware, software, and firmware. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the command is executed by one or more processors (for example, the processor 906 in FIG. 20), the one or more processors may execute a function corresponding to the command. The computer-readable storage medium may be, for example, the memory (907 in FIG. 20).

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

As described above, a protective cover according to various embodiments of the present disclosure may include: a first cover part arranged to open/close the front surface of the electronic device, a second cover part rotatably coupled to the first cover part and detachably arranged on the rear surface of the electronic device; and an input device detachably arranged in the first cover part.

Further, according to various embodiments of the present disclosure, the input device may include a keyboard.

Further, according to various embodiments of the present disclosure, the first cover part may include a window part for exposing a part of the front surface of the electronic device to the outside.

Further, according to various embodiments of the present disclosure, on the first cover part, the window part can be arranged on a first region, and the input device can be arranged on a second region adjacent to the first region.

Further, the protective cover according to various embodiments of the present disclosure may further include: an engaging groove formed in one of the first cover part and the input device; and an engaging part formed in the other one of the first cover part and the input device, wherein the engaging part can be formed to be attached to/detached from the engaging groove.

Further, according to various embodiments of the present disclosure, the first cover part may include a guide part for guiding the input device, and the input device can be guided by the guide part to be slidably connected to the first cover part.

Further, according to various embodiments of the present disclosure, the first cover part may include an engaging part for surrounding and binding the circumference of the input device.

Further, the protective cover according to various embodiments of the present disclosure may further include a first magnetic part provided to the input device; and a second magnetic part provided to the first cover part, wherein the input device can be mounted to the first cover part by attractive force between the first and second magnetic parts.

Further, the protective cover according to various embodiments of the present disclosure may further include an opening part formed in the first cover part to correspond to the input device.

Further, the protective cover according to various embodiments of the present disclosure may further include a hinge part arranged in the opening part to be hinge-coupled to opposite sides of the input device, wherein the input device can rotate on the opening part while being bound to the hinge part.

Further, according to various embodiments of the present disclosure, the second cover part may include an attachment/detachment part attached to/detached from the rear surface of the electronic device; a connection part for connecting the attachment/detachment part to the first cover part; a first curved part arranged between the attachment/detachment part and the connection part to rotatably connect the attachment/detachment part to the connection part; and a second curved part arranged between the connection part and the first cover part to rotatably connect the connection part and the first cover part.

Further, the protective cover according to various embodiments of the present disclosure may further include a window part formed on the first cover part between the second curved part and the input device.

Further, according to various embodiments of the present disclosure, the first cover part may include a holding part formed in the first cover part to hold one end of the electronic device.

Further, according to various embodiments of the present disclosure, the input device can be mounted to the first cover part, and the holing part may include a first holding part formed between the input device and the second curved part.

Further, according to various embodiments of the present disclosure, one end of the electronic device is held on the first holding part so that the protective cover can be arranged slantingly to the first cover part while being adjacent to the input device.

Further, according to various embodiments of the present disclosure, the holding part may include a second holding part formed between one end of the first cover part and the input device.

Further, according to various embodiments of the present disclosure, one end of the electronic device is held on the second holding part so that the protective cover can be arranged slantingly to the first cover part while concealing the input device.

While the present disclosure has been shown and described with reference to certain embodiments thereof, it will be understood by those skilled in the art that various changes in form and details may be made therein without departing from the spirit and scope of the present disclosure as defined by the appended claims.

What is claimed is:

1. A protective cover of an electronic device, the protective cover comprising:
   a first cover part arranged to open to expose a front surface of the electronic device and close to conceal the front surface of the electronic device;
   a second cover part rotatably coupled to the first cover part and detachably arranged on a rear surface of the electronic device;
an input device detachably provided in a reception part formed in the first cover part, an engaging groove formed in one of the first cover part and the input device; and an engaging part formed in the other one of the first cover part and the input device, wherein the engaging part is attachable to and detachable from the engaging groove; wherein the second cover part comprises:
an attachment/detachment part attached to/detached from the rear surface of the electronic device;
a connection part for connecting the attachment/detachment part to the first cover part; a first curved part formed between the attachment/detachment part and the connection part and disposed in contact with the attachment/detachment part and the connection part, the first curved part rotatably connecting the attachment/detachment part and the connection part; and
a second curved part formed between the connection part and the first cover part and disposed in contact with the connection part and the first cover part, a second curved part rotatably connecting the connection part and the first cover part,
wherein the first cover part including the reception part and the connection part of the second cover part are rotatable toward the rear surface of the electronic device,
wherein the first cover part includes a holding part formed protruded from the first cover part to hold one end of the electronic device.

2. The protective cover of claim 1, wherein the input device includes a keyboard.

3. The protective cover of claim 1, wherein the first cover part includes a window part for exposing a part of the front surface of the electronic device.

4. The protective cover of claim 3, wherein, on the first cover part, the window part is arranged on a first region, and the input device is arranged on a second region adjacent to the first region.

5. The protective cover of claim 1, wherein the first cover part includes a guide part for guiding the input device, and
   the input device is guided by the guide part to be slidably coupled to the first cover part.

6. The protective cover of claim 1, wherein the first cover part includes a coupling part for surrounding and binding a circumference of the input device.

7. The protective cover of claim 1, further comprising:
   a first magnetic part coupled to the input device; and
   a second magnetic part coupled to the first cover part,
   wherein the input device is mounted on the first cover part by attractive force between the first and second magnetic parts.

8. The protective cover of claim 1, further comprising an opening part formed in the first cover part to correspond to the input device.

9. The protective cover of claim 8, further comprising a hinge part arranged in the opening part to be hinge-coupled to opposite sides of the input device,
   wherein the input device rotates on the opening part while being bound to the hinge part.

10. The protective cover of claim 1, further comprising a window part formed between the second curved part and the input device on the first cover part.

11. The protective cover of claim 1, wherein the input device is mounted on the first cover part, and the holding part includes a first holding part arranged between the input device and the second curved part.

12. The protective cover of claim 11, wherein one end of the electronic device is held on the first holding part so that the electronic device is arranged slantingly with respect to the first cover part and is adjacent to the input device.

13. The protective cover of claim 1, wherein the holding part includes a second holding part arranged between one end of the first cover part and the input device.

14. The protective cover of claim 13, wherein one end of the electronic device is held on the second holding part and the protective cover is arranged slantingly with respect to the first cover part while concealing the input device.

* * * * *